United States Patent
Mitchell, Jr.

[11] 3,894,794
[45] July 15, 1975

[54] LIQUID CRYSTAL IMAGING SYSTEM USING TRIBULYLTIN OXIDE

[75] Inventor: Charles W. Mitchell, Jr., Webster, N.Y.

[73] Assignee: Xerox Corporation, Stamford, Conn.

[22] Filed: Oct. 7, 1974

[21] Appl. No.: 513,004

[52] U.S. Cl. ............ 350/160 LC; 252/299; 96/1 R
[51] Int. Cl. .............................................. G02f 1/16
[58] Field of Search ...... 252/299, 408; 350/160 LC; 96/1 R

[56] References Cited
UNITED STATES PATENTS

| | | |
|---|---|---|
| 3,722,998 | 3/1973 | Morse .................................. 355/71 |
| 3,795,516 | 3/1974 | Stahr et al. ............................ 96/1.5 |
| 3,795,517 | 3/1974 | Sutton .................................... 96/1.5 |

*Primary Examiner*—Edward S. Bauer
*Attorney, Agent, or Firm*—James J. Ralabate; David C. Petre; George J. Cannon

[57] ABSTRACT

Electro-optical lifetimes of liquid crystalline compositions comprising a nematic liquid crystalline material and an optically active material are extended by contact with tributyltin oxide.

19 Claims, 5 Drawing Figures

3,894,794

LIQUID CRYSTAL IMAGING SYSTEM USING TRIBULYLTIN OXIDE

BACKGROUND OF THE INVENTION

This invention relates to liquid crystalline compositions comprising a nematic liquid crystalline material and an optically active material; and, more particularly to extending the lifetime of such compositions.

Generally speaking, electro-optical systems employing liquid crystalline materials in contact with an electrode or a photoconductive layer enjoy a wide range of applications but have heretofore been limited in duration of operation due to the interaction of the liquid crystalline material and the electrode or photoconductive layer. This duration of lifetime has been particularly limited in cells having a photoconductive layer. Prior attempts to prevent or retard degradation of such devices have included the use of a barrier layer such as the cellulose nitrate barrier layer disclosed in U.S. Pat. No. 3,722,998 and the polymer barrier layers disclosed in U.S. Pat. No. 3,795,516 and U.S. Pat. No. 3,795,517.

In new and growing areas of technology such as liquid crystalline imaging, new methods, apparatus, composition, and articles of manufacture are often discovered for the application of the new technology in a new mode. The present invention relates to a novel method of providing an additive which when in contact with a nematic liquid crystalline material extends the electro-optical lifetime thereof.

SUMMARY OF THE INVENTION

It is an object of this invention to provide a novel additive which when in contact with a liquid crystalline composition comprising an optically active material and a nematic liquid crystalline material will extend the electro-optical lifetime thereof when the composition is in contact with a photoconductor.

It is yet a further object of this invention to provide novel liquid crystalline compositions which have extended electro-optical lifetimes.

The foregoing objects and others are accomplished in accordance with this invention by providing tributyltin oxide (hereinafter TBTO) in contact with a liquid crystalline composition comprising a nematic liquid crystalline material and an optically active material. In use, the tributyltin oxide may be dispersed uniformly throughout the liquid crystalline composition or coated as a layer upon a suitable substrate and placed in contact with the liquid crystalline composition.

BRIEF DESCRIPTION OF THE DRAWINGS

For a better understanding of the invention as well as other objects and further features thereof, reference is made to the following detailed disclosure of preferred embodiments of the invention taken in conjunction with the accompanying drawings thereof, wherein.

DESCRIPTION OF THE PREFERRED EMBODIMENTS

It has been discovered that liquid crystalline compositions, comprising a nematic liquid crystalline material and an optically active material, in contact with tributyltin oxide (TBTO) have extended electro-optical lifetime. "Electro-optical" lifetime is used herein to mean the number of imaging cycles undergone by the liquid crystalline composition under an applied voltage prior to degradation of image quality.

Figure 1:
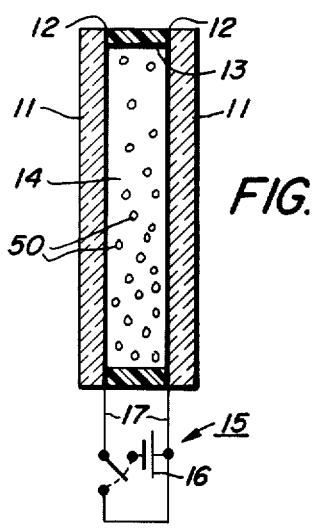
FIG. 1 is a partially schematic, cross-sectional view of a liquid crystalline electro-optical cell wherein the TBTO is dispersed in the liquid crystalline composition.
Figure 2:
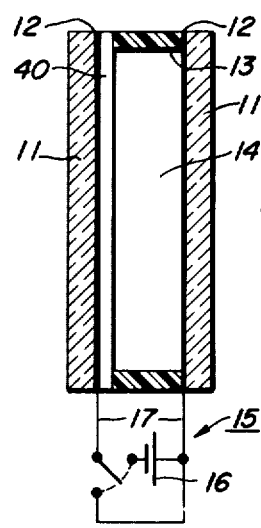
FIG. 2 is a partially schematic, cross-sectional view of a liquid crystalline electro-optical cell wherein the TBTO is provided as a separate layer in contact with the liquid crystalline composition.

FIG. 1 illustrates the embodiment where TBTO, 50, is dispersed in the layer 14 of liquid crystalline composition and FIG. 2 illustrates the embodiment where a separate layer 40 of TBTO is in contact with layer 14 of liquid crystalline composition.

TBTO can be conveniently dispersed in layer 14 by dissolution in a suitable solvent, for example, organic solvents such as chloroform, trichloroethylene, tetrachloroethylene, petroleum ether, methylethyl ketone, isopropanol, toluene, and others. The solution containing the liquid crystalline material and TBTO is then typically poured, sprayed, or otherwise applied to a suitable substrate. After evaporation of the solvent, a thin layer of liquid crystal remains on the substrate. Alternatively, the liquid crystalline materials along with the TBTO may be combined and directly applied to a suitable substrate by heating the mixed components above the isotropic transition temperature of the liquid crystalline components, and mixing the components before application to the substrate. Room temperature liquid crystals may be used in their natural room temperature condition with the TBTO mixed therein. In the present invention, where such liquid crystalline compositions are used in electro-optic cells, such compositions may be injected into position in such electro-optic cells.

In the FIG. 1 embodiment, TBTO is typically added to the liquid crystalline composition in amounts in the range between about 0.1 and about 10% by weight, which amounts are typically sufficient. Any effective amount less than 0.1% can be utilized; the upper limit being the amount large enough to cause transition to the isotropic state.

The liquid crystal layers or films suitable for use in the present invention are preferably of a thickness in the range of about 250 microns or less, although thicker films may perform satisfactorily in some embodiments of the instant invention.

When TBTO is to be utilized as a separate layer, the FIG. 2 embodiment, the above procedure may be utilized to provide a layer of liquid crystalline composition lacking TBTO residing on a layer 40 of TBTO residing on a suitable substrate. The layer 40 of TBTO can be conveniently provided by dissolving the TBTO in an organic solvent such as, for example petroleum ether. It is to be noted that tributyltin oxide is soluble in most organic solvents. The solution of TBTO and organic solvent can be conveniently applied to any suitable substrate by any of the aforementioned techniques and the solvent allowed to evaporate such as, for example, by air-drying to leave a residual film of TBTO upon the substrate. The relative concentrations of TBTO to organic solvent is typically characterized by the addition of 1 gram of TBTO to a volume of organic solvent up to about 30 cc. It will be appreciated, of course, that for any given liquid crystalline composition, the concentration of TBTO in organic solvent can be employed so long as the desired effect is obtained.

Any liquid crystalline composition comprising a nematic liquid crystalline material and an optically active material can be utilized in accordance with the practice of the present invention. Typical suitable nematic liquid crystalline materials include p-azoxyanisole, p-azoxyphenetole, p-butoxybenzoic acid, p-methoxycinnamic acid, butyl-p-anisylidene-p-aminocinnamate, anisylidene, para-aminophenylacetate, p-ethoxybenzylamino-a-methyl-cinnamic acid, 1,4-bis(p-ethoxybenzylidene) cyclohexanone, 4,4'-dihexyl-oxybenzene, 4,4'-diheptyloxybenzene, anisal-p-amino-azo-benzene, anisaldazine, a-benzeneazo-(anisal-α'-naphthylamine), n,n'-nonoxybenzetoluidine; anils of the generic group (p-n-alkoxybenzylidene-p-n-alkylanilines), such as p-methoxybenzylidene-p'-n-butylaniline; nematic compounds of the alkoxybenzylidene-aminoalkylphenone group, such as methoxybenzyl-idene-amino-butyrophenone and methoxybenzylidene amino-valerophenone; mixtures of the above and others.

Typical suitable optically active materials include non-mesomorphic optically active materials and mesomorphic optically active materials. Typical suitabel non-mesomorphic optically active materials include: derivatives of alcohols such as 1-menthol, 1-linanool, d-mannitol, d-borneol and d-quercitol; derivatives of ketones such as d-camphor, d-3-methylcyclohexanone, 1-methone and 1-6-isopropyl-3-cyclohexanone; derivatives of carboxylic acids such as d-citronellic acid, 1-citronellic acid, d-chaulmoogric acid, 1-campholic acid, 1-arabonic acid, d-tartaric acid, and 1-ascorbic acid; derivatives of aldehydes such as d-citronellal; derivatives of alkenes such as 1-B-pinane, d-silversterene, and d-linonene; derivatives of amines such as 1-2-methylpiperidine; derivatives of nitriles such as d-mandelonitrile; derivatives of amides such as d-hydrocarbamide; and mixtures thereof.

Mixtures of the nematic liquid crystalline material and the optically active, non-mesomorphic material can be prepared in organic solvents such as chloroform, petroleum ether, methyl-ethyl ketone and the like, which are typically subsequently evaporated from the mixture thereby leaving the liquid crystalline composition. Alternatively, the individual components of the liquid crystalline composition can be combined directly by heating the mixed components to a temperature which is above the isotropic transition temperature of the nematic liquid crystalline substance and the melting point of the non-mesomorphic material.

Typical suitable mesomorphic optically active materials include liquid crystalline optically active materials such as cholesteric liquid crystalline materials. Typical suitable cholesteric liquid crystalline materials include derivatives from reactions of cholesterol and inorganic acids; for example, cholesteryl chloride, cholesteryl bromide, cholesteryl iodide, cholesteryl nitrate; esters derived from reactions of cholesterol and carboxylic acids; for example cholesteryl crotonate; cholesteryl nonanoate; cholesteryl hexanoate; cholesteryl formate; cholesteryl chloroformate; cholesteryl propionate; cholesteryl acetate, cholesteryl valerate; cholesteryl linolate; cholesteryl linolenate; cholesteryl oleate; cholesteryl erucate; cholesteryl butyrate; cholesteryl caprate; cholesteryl laurate; cholesteryl myristate; ethers of cholesterol such as cholesteryl decyl ether; cholesteryl oleyl ether; cholesteryl dodecyl ether; carbamates and carbonates of cholesterol such as cholesteryl decyl carbonate; cholesteryl oleyl carbonate; cholesteryl methyl carbonate; cholesteryl ethyl carbonate; cholesteryl butyl carbonate; cholesteryl docosonyl carbonate; cholesteryl heptyl carbamate; and alkyl amides and aliphatic secondary amines derived from $3\beta$-amino-$\Delta^5$-cholestene and mixtures thereof; peptides such as poly-$\gamma$-benzyl-l-glutamate; derivatives of beta sitosterol such as sitosterol chloride; and active amyl ester of cyano benzylidene amino cinnamate. The alkyl groups in said compounds are typically saturated or unsaturated fatty acids, or alcohols, having less than about 25 carbon atoms and unsaturated chains of less than about 5 double-bonded olefinic groups. Aryl groups in the above compounds typically comprise simply substituted benzene ring compounds. Any of the above compounds and mixtures thereof may be suitable for cholesteric liquid crystalline films in the advantageous system of the present invention.

Figure 3:
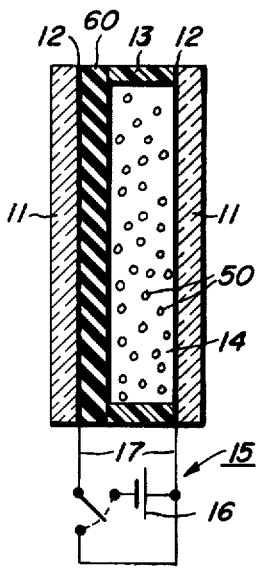
FIG. 3 is a partially schematic, cross-sectional view of the FIG. 1 embodiment further including a layer of photoconductive material to allow optical input in imagewise configuration.
Figure 4:
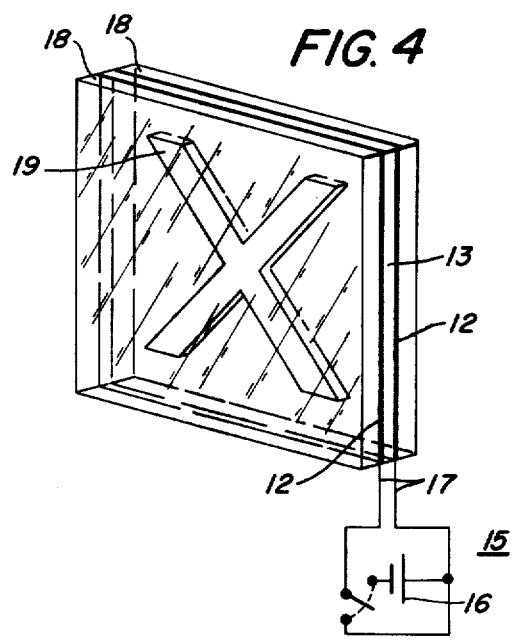
FIG. 4 is a partially schematic isometric view of an embodiment of a liquid crystalline electro-optic imaging cell wherein the desired image is defined by the shape of the liquid crystalline material as confined by the shape of the spacing member.
Figure 5:
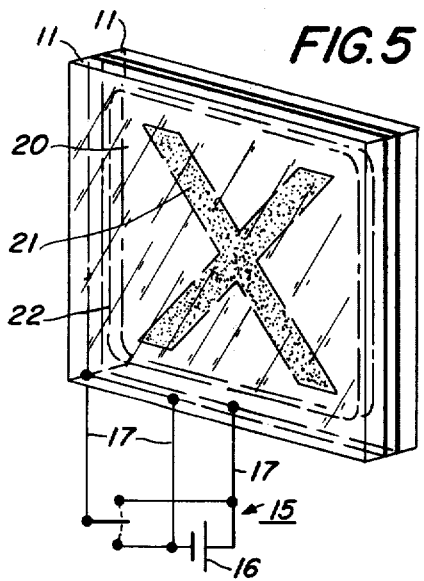
FIG. 5 is a partially schematic isometric view of an embodiment of a liquid crystalline electro-optic imaging cell wherein the desired image is defined by the shape of at least one of the electrodes.

Referring now to FIG. 3 through 5, like numerals refer to like members throughout the figures. FIG. 3 schematically illustrates a layer 14 of liquid crystalline composition sandwiched between a photoconductive layer 60 and an electrode, each electrode comprising an electrically insulating substrate 11 overcoated with a conductive coating 12. Typical suitable substrates include glass, plastic, papers, ceramics and other insulators. Typical suitable electrically conductive materials include gold, indium oxide, tin oxide, silver and other conductors. An example of a conductively coated insulator is NESA glass available from Pittsburgh Plate Glass Co. Layer 14 is contained by spacer 13. Conductive coatings 12 are electrically connected by electrical network 15 to a suitable voltage source 16 by electrical leads 17. Spacer 13 is typically chemically inert, transparent, substantially insulating and has appropriate dielectric characteristics. Materials suitable for use as insulating spacer 13 include cellulose acetate, cellulose triacetate, cellulose acetate butyrate, polyurethane elastomers, polyethylene, polypropylene, polyesters, polystyrene, polycarbonate, polyvinyfluoride, polytetrafluoroethylene, polyethylene terephthalate, and mixtures thereof. Spacer 13 is preferably of a thickness in the range of about 100 microns or less, although the thicker spacers can be satisfactorily employed.

In FIGS. 3 through 5 the layer of liquid crystalline composition contain TBTO. However, it will be understood that in all of the embodiments of the present invention, the TBTO can be included as a separate layer between the liquid crystalline composition.

The embodiment depicted in FIG. 4 has suitable substrates 18 overcoated with conductive coatings 12, spacer member 13 having a void or cutout portion 19 which contains the liquid crystalline composition. The FIG. 4 embodiment thereby has an imagewise configured layer of liquid crystalline composition comprising the tributyltin oxide subjected to the application of voltage uniformly thereacross. This is to be contrasted with the FIG. 3 embodiment wherein a uniform layer of liquid crystalline composition is subjected to a voltage applied uniformly thereacross.

The FIG. 5 embodiment is one in which the desired image is defined by the shape of an electrode 21. The imaging member here comprises transparent plates 11 separated by spacer 13 having void area 20 filled with a nematic liquid crystalline composition and comprising substantially the entire area of spacer 13. The desired image is defined by the shape of the substantially transparent conductive coating 21 which is affixed to the inner surface of one or both of the transparent support plates 11, and is affixed only in the desired image configuration. It will be understood that both electrodes can easily be made in a matched pair to define the same desired image, although only one conductive coating need be in imagewise configuration. In operation, the FIG. 5 embodiment subjects the liquid crystalline composition to an applied voltage only in areas common to the two electroded surfaces of substrates 11.

In embodiments of the present invention where optical input is desired to be provided in imagewise configuration in order to alter the voltage applied across the liquid crystalline composition, a photoconductive layer 60 is included in the electro-optical system between the liquid crystalline composition and the conductive coating of one of the electrodes as shown in FIG. 3. More particularly, in embodiments where the agent is to be provided as a separate layer and not dispersed in the liquid crystalline composition, the layer of agent is provided between the liquid crystalline composition and the photoconductive layer.

Typical suitable photoconductive materials include photoconductive inorganic materials and photoconductive organic materials. Typical suitable inorganic photoconductive materials include sensitized zinc oxide, for example, sensitized by the addition of Rhodamine Dye, available from Dupont; selenium, selenium alloyed with arsenic such as, for example, arsenic triselenide, tellurium, antimony or bismuth; cadmium sulfide, cadmium sulfoselenide, and the many other typical suitable inorganic photoconductive materials listed in U.S. Pat. No. 3,121,006 to Middleton et al. and listed in U.S. Pat. No. 3,288,603, both of which patents are hereby incorporated by reference. Typical suitable organic photoconductive materials include, for example, the combination of 2,5-bis(p-aminophenyl)-1,3,4-oxadiazole available under the trademark TO 1920 from Kalle and Company, Weisbaden-Biebrich, Germany and Vinylite VYNS, a copolymer of vinyl chloride and vinyl acetate, available from Carbide and Carbon Chemicals Company; and the combination of 2,4,7-trinitro-9-fluorenone to polyvinylcarbazole, available under the trademark Luvican 170 from Winter, Wolf and Company, New York, N.Y. The thickness of the photoconductive layer is not critical to the practice of the invention. Typical suitable thicknesses are from about 1 to about 100 microns.

It will be appreciated, of course, that the optical input includes a wavelength of radiation which is actinic to the photoconductive material. That is, the wavelength of radiation is within the fundamental absorption band of the photoconductive material utilized.

The following examples further specifically describe the best mode of the preferred embodiments of the present invention. Parts and percentages are by weight unless otherwise noted.

EXAMPLE I

An electro-optic system comprising a photoconductive layer is prepared as follows: two electrodes are prepared by coating glass plates of about 2×2×¼ inch with indium oxide conductive coatings; on one of the indium oxide coatings an about 7 micron thick photoconductive layer of arsenic triselenide was vacuum evaporation; an about ½ mil thick Tedlar spacer was placed atop the photoconductive layer and had a void cross-section of about 6 cm². A liquid crystalline composition comprising about 75 percent Dynamic Scattering Mixture *No. 11643 available from Eastman Kodak Co. and about 25 percent cholesteryl oleyl carbonate is prepared by simple mixing. To this composition bis-(tri-n-butyl) tin oxide, available from M and T Chemicals, Inc., is added in an amount equalling 1 percent by weight of the resulting composition. The resulting composition is heated to the isotropic transition temperature of about 100°C and then poured into the spacer void. The second electrode is placed over the spacer, with its indium oxide coating in contact with the liquid crystalline composition.

Name: Nematic Mixture, Dynamic Scattering, I
Typical Lot Data:
 Nematic range: 9° to 99°C
 Dielectric anisotropy (at 0.05 $V_{pp}$, 1.0 HKz, 25°C):

$\epsilon_\perp / \epsilon_{||} = 1.32$
 $\epsilon_{||} - \epsilon_\perp = 1.65$ Resistivity (at 35.4 $V_{rms}$, 500 Hz, 23°C):

$2.9 \times 10^9$ ohm-cm

Threshold voltage: 8.1 $V_{rms}$ (60 Hz sine wave)
 Initial transmission: 80% (homogeneous alignment).

The indium oxide coating is electrically connected to a variable voltage source. Imaging is conducted by applying about 110 volts D.C. and directing imagewise configured radiation of about 4,850A wavelength at an intensity of about 50 ergs/sec for about 1.3 seconds upon the photoconductive layer. Erasure is had by applying 400 volts peak to peak AC at a frequency of 2 KHz for about 2 seconds.

An electro-optical lifetime of at least about 44,000 imaging cycles is obtained without image quality degradation.

EXAMPLE II

Example I is repeated except that the tributyltin oxide is omitted. The electro-optical lifetime is only about 7,000 imaging cycles.

It will be appreciated that other variations and modifications will occur to those skilled in the art upon a reading of the present disclosure. These are intended to be within the scope of this invention.

What is claimed is:

1. A liquid crystalline composition comprising a mixture of nematic liquid crystalline material and an optically active material, and tributyltin oxide, said oxide present in an amount effective to extend the electro-optical lifetime of said mixture of nematic liquid crystalline material and optically active material.

2. The composition of claim 1 wherein said optically active material is a cholesteric liquid crystalline material.

3. The composition of claim 1 wherein said optically active material is a non-mesomorphic material.

4. The device according to claim 1 wherein said mixture of nematic liquid crystalline material and optically active material is provided in imagewise configuration.

5. A nematic liquid crystalline composition comprising a mixture of nematic liquid crystalline material and an optically active material, and at least about 0.1 percent by weight tributyltin oxide.

6. The composition of claim 5 wherein said tributyltin oxide is present in an amount up to about 10 percent by weight of the liquid crystalline composition.

7. An electro-optic device, comprising between two electrodes tributyltin oxide in contact with a mixture of a nematic liquid crystalline material and an optically active material.

8. The device according to claim 7 wherein said oxide is uniformly dispersed within said mixture.

9. The method according to claim 7 wherein said oxide is in layer configuration.

10. The device according to claim 9 wherein said layer of tributyltin oxide is in imagewise configuration.

11. The device according to claim 7 wherein one of said electrodes is in imagewise configuration.

12. A method for imaging a mixture of a nematic liquid crystalline material and an optically active material, comprising:
   a. providing between two electrodes, said mixture in contact with tributylin oxide; and
   b. applying a voltage across said mixture wherein the optical properties of said mixture are changed in areas thereof subjected to said applied voltage; one of said mixture and said applied voltage being provided in imagewise configuration.

13. The method according to claim 12 wherein said mixture is provided in imagewise configuration.

14. The method according to claim 12 wherein said voltage is applied in imagewise configuration.

15. The method according to claim 12 wherein said tributyltin oxide is uniformly dispersed within said mixture.

16. The method according to claim 12 wherein said tributyltin oxide is provided in layer configuration.

17. The method according to claim 12 further including between one of said electrodes and said mixture a layer of photoconductive material and further including in the performance of step (b) the step of irradiating said photoconductive material with actinic radiation in imagewise configuration.

18. The method according to claim 17 wherein said photoconductive material comprises arsenic triselenide.

19. A method for imaging a mixture of nematic liquid crystalline material and an optically active material, comprising:
   a. providing between two electrodes, a layer of tributyltin oxide in imagewise configuration in contact with said mixture; and
   b. applying a voltage across said mixture wherein the optical properties of said nematic liquid crystalline composition at least in areas thereof corresponding to said imagewise configured layer of tributyltin oxide are changed upon being subjected to said applied voltage.

* * * * *